United States Patent
Trejo Esqueda et al.

(10) Patent No.: US 11,957,229 B2
(45) Date of Patent: Apr. 16, 2024

(54) METALLIC ROLL-ON CONTAINER

(71) Applicant: Ball Corporation, Westminster, CO (US)

(72) Inventors: Hector Horacio Trejo Esqueda, San Luis Potosi (MX); Ivann Cruz Navarro, San Luis Potosi (MX)

(73) Assignee: BALL CORPORATION, Westminster, CO (US)

( * ) Notice: Subject to any disclaimer, the term of this patent is extended or adjusted under 35 U.S.C. 154(b) by 548 days.

(21) Appl. No.: 17/116,626

(22) Filed: Dec. 9, 2020

(65) Prior Publication Data
US 2021/0169201 A1  Jun. 10, 2021

Related U.S. Application Data

(60) Provisional application No. 62/945,723, filed on Dec. 9, 2019.

(51) Int. Cl.
*A45D 34/04* (2006.01)
*B21C 23/18* (2006.01)
(Continued)

(52) U.S. Cl.
CPC ............ *A45D 34/041* (2013.01); *B23P 19/02* (2013.01); *C22C 21/00* (2013.01); *C22F 1/04* (2013.01);
(Continued)

(58) Field of Classification Search
CPC .... A45D 34/041; A45D 40/261; C22C 21/00; C22F 1/04; B23P 19/02; B21D 51/2638; B21C 23/18; B22D 21/007
(Continued)

(56) References Cited

U.S. PATENT DOCUMENTS 2,281,649 A * 5/1942 Williams ............... B65D 41/16
                                                     215/352
2,834,321 A    5/1958 Duefrene
(Continued)

FOREIGN PATENT DOCUMENTS

DE        10041246      3/2002
DE     202005011107    10/2005
(Continued)

OTHER PUBLICATIONS

International Search Report and Written Opinion for International (PCT) Patent Application No. PCT/US2020/63978, dated Apr. 1, 2021, 15 pages.
(Continued)

*Primary Examiner* — David J Walczak
(74) *Attorney, Agent, or Firm* — Sheridan Ross P.C.

(57) ABSTRACT

An aluminum roll-on container, and a method of manufacturing the same, retains a roller sphere for applying a product onto an external surface. The roller sphere can both rotate and move within the container, and a chamber is formed between the container and the roller sphere. In a first position of the roller sphere, the chamber forms a continuous volume with the interior volume of the container such that the chamber receives a product stored in the container volume. Then, in a second position, the chamber forms a continuous volume with the external environment such that rotation of the roller sphere transfers the product from the chamber to an external surface. A relationship between the roller sphere and an upper opening of the container allows the roller sphere to be pressed into the container and then retained in the container.

20 Claims, 10 Drawing Sheets

(51) Int. Cl.
  *B21D 51/26* (2006.01)
  *B22D 21/00* (2006.01)
  *B23P 19/02* (2006.01)
  *C22C 21/00* (2006.01)
  *C22F 1/04* (2006.01)

(52) U.S. Cl.
  CPC .......... *A45D 2200/00* (2013.01); *B21C 23/18* (2013.01); *B21D 51/2638* (2013.01); *B22D 21/007* (2013.01)

(58) Field of Classification Search
  USPC .......................... 401/208–216; 215/317, 321
  See application file for complete search history.

(56) References Cited

U.S. PATENT DOCUMENTS

| | | | |
|---|---|---|---|
| 4,164,377 A | | 8/1979 | Lohrman et al. |
| 4,603,994 A | * | 8/1986 | Mitsuda .................. B43K 1/08 401/199 |
| 4,940,350 A | | 7/1990 | Kim |
| 7,311,462 B2 | * | 12/2007 | Kervoalen ........... A45D 34/041 401/209 |
| 7,618,208 B2 | | 11/2009 | Baines et al. |
| 8,261,424 B1 | * | 9/2012 | Thomeczek ........... B23P 11/00 29/520 |
| 8,939,669 B2 | | 1/2015 | Le et al. |
| 8,956,066 B2 | | 2/2015 | Young et al. |
| 9,456,677 B2 | | 10/2016 | Künz |
| 9,517,498 B2 | | 12/2016 | Siles et al. |
| 2002/0012565 A1 | | 1/2002 | Sirna et al. |
| 2007/0071538 A1 | | 3/2007 | Doria |
| 2012/0034017 A1 | | 2/2012 | Archer et al. |
| 2014/0010582 A1 | | 1/2014 | Arminak |
| 2014/0321898 A1 | * | 10/2014 | Kunz .................... A45D 33/12 401/216 |
| 2017/0231355 A1 | | 8/2017 | Spector |

FOREIGN PATENT DOCUMENTS

| | | |
|---|---|---|
| FR | 2696914 | 4/1994 |
| GB | 635692 | 4/1950 |
| GB | 710585 | 6/1954 |
| GB | 1515078 | 6/1978 |
| GB | 2255052 | 10/1992 |
| GB | 2268912 | 1/1994 |

OTHER PUBLICATIONS

Partial Supplementary Search Report for Europe Patent Application No. 20900153.6, dated Nov. 7, 2023, 17 pages.

* cited by examiner

METALLIC ROLL-ON CONTAINER

CROSS-REFERENCE TO RELATED APPLICATIONS

This application claims priority under 35 U.S.C. § 119(e) to U.S. Provisional Patent Application Ser. No. 62/945,723 filed Dec. 9, 2019, which is incorporated herein in its entirety by reference.

FIELD

The present disclosure relates generally to a recyclable metal container with a rolling component that applies product stored in the container onto an external surface. More specifically, this disclosure relates to a metallic roll-on container with a roller sphere.

BACKGROUND

Roll-on containers can be used to apply a product onto an external surface, for instance, deodorant onto skin. These containers are typically made from plastic materials such as high density polyethylene (HDPE) or polypropylene (PP). These plastic materials are used to make roll-on containers since the plastic materials can be cheaply manufactured into complex shapes, and the resulting containers are resistant to harmful chemicals, resistant to impacts, and are light in weight to reduce transportation costs.

However, there are several disadvantages with the use of these plastics to make containers. First, recycling plastic is inherently difficult, and mixing different types of plastics together for recycling has a negative effect on the resulting material. When different types of plastic are melted together, they tend to phase-separate, like oil and water, and set in these layers. The phase boundaries cause structural weakness in the resulting material, which is then useful in only limited applications. Notably, common plastics such as HDPE and PP exhibit this behavior, and therefore, have a limited usefulness when recycled. Moreover, each time plastic is recycled, new plastic material must be added to maintain the integrity of the resulting material. Even when recycled plastic has new plastic material added in, the same plastic can only be recycled two to three times before the quality of the resulting material decreases to the point where the plastic can no longer be used.

Plastics are also harmful to the environment, and recent environmental efforts have been focused on limiting the consumption of plastics, products wrapped in plastic, etc. Plastics can release harmful chemicals into the ground soil, which then moves into the ground water. This can cause wide ranging negative effects to wildlife, including animals that consume tainted ground water. This type of pollution is also apparent in the world's oceans where, as of 2012, there is an estimated 165 million tons of plastic pollution. In addition to the above issues and health effects, it takes a long time for plastic to degrade. It is estimated that a foam plastic cup will take 50 years, a plastic beverage holder will take 400 years, a disposable diaper will take 450 years, and fishing line will take 600 years to degrade. This obviously raises serious environmental concerns.

SUMMARY

The present disclosure provides a roll-on container made from aluminum or other metallic materials to address the above issues with plastic containers used by consumers. Aluminum containers can be recycled an infinite number of times, and aluminum can be recycled without the necessity of adding new materials during the recycling process. Moreover, aluminum containers can be manufactured using an impact extrusion process to create containers with complex shapes.

It is an aspect of some embodiments of the present disclosure to provide a roll-on container with a roller sphere to transfer product from the container to an external surface. The roller sphere is retained in the container at an open upper end of the container so that the roller sphere can both rotate and move between various positions along a longitudinal axis of the container. One or more arcuate sidewalls of the container define an upper opening and a lower opening within the container, and the arcuate sidewalls and the roller sphere define a chamber between the openings that has a maximum inner diameter. An outer diameter of the roller sphere is greater than a diameter of the upper opening but less than the maximum inner diameter of the chamber. Thus, the roller sphere is retained within the container, and the roller sphere can move along a longitudinal axis of the container between a position against the upper opening and a position against the lower opening. As described in further detail below, this movement along the longitudinal axis allows product to move from within the container to the chamber and then from the chamber onto the roller sphere, and the product is subsequently applied to an external surface. In some embodiments, the maximum inner diameter is between approximately 1% and 4% larger than the diameter of the roller sphere to allow these functions.

It is another aspect of some embodiments of the present disclosure to provide a roll-on container with a roller sphere where at least the container is made from aluminum or an aluminum alloy to allow the recycling of the container. In some embodiments, the roller sphere can also be made from recyclable aluminum or an aluminum alloy, including aluminum or an aluminum alloy that has already been recycled at least once. As noted above, the roller sphere generally has a larger diameter than the upper opening defined by the arcuate sidewall to retain the roller sphere in the container. However, the roller sphere and the container body are initially made separately, and then the roller sphere is pressed into the open end of the container body, which temporarily deforms the arcuate sidewall such that the upper opening is as large as the diameter of the roller sphere. Then, the arcuate sidewall springs back after the diameter of the roller sphere passes the upper opening to retainer the roller sphere in the container.

Making plastic products with interference fits is relatively simple because of the low Young's modulus of plastic materials, meaning the material is easily bended or stretched. In contrast, Aluminum has a much different and higher Young's modulus. Thus, an aluminum or metallic product with an interference fit is different because the material is much more likely to be damaged or plastically deformed. Therefore, a specific relationship between a metallic container and the roller sphere is provided such that the arcuate sidewall of the metallic container can be deflected and then spring back to retain the roller sphere in the container. To provide for a sufficient amount of spring back from the aluminum material to retain the roller sphere within the container, the diameter of the roller sphere can be approximately 0.8% to 1.3% larger than the diameter of the upper opening defined by the arcuate sidewall in some embodiments. In various embodiments, the diameter of the roller sphere can be approximately 25 mm, and the diameter of the upper opening can be at least 24.7 mm. Further of note, the aluminum material retains the same material properties through the recycling process, unlike plastic. Therefore, the specific relationship between the upper opening and the roller sphere holds true for the aluminum material, regardless of the number of times the material has been recycled.

It is a further aspect of some embodiments of the present disclosure to provide a cap that can securely fit onto a shoulder of the container and cover the roller sphere to prevent or reduce evaporation, spilling, or dehydration of the product stored in the container. In some embodiments, an inward curl defines an opening of the cap, and a diameter of the opening is smaller than a diameter of the shoulder. Thus, when the cap is pressed onto an end of the container, the inward curl can deform to create an interference fit between the inward curl and the shoulder. In addition, an interior surface of the cap can contact and move the roller sphere against a lower opening when the cap is secured to the shoulder to seal the product stored within the container and prevent dehydration of the product.

While the dimensions and relative dimensional relationship are described with respect to a material that at least partially comprises aluminum, embodiments of the present disclosure can apply to other materials using the principles and even relative dimensional relationships described herein. Other pliable, selectively deformable, metallic materials could include tin, steel, or other materials generally having a Young's modulus greater than 50 GPa.

One specific embodiment of the present disclosure is a metallic roll-on container for applying a product onto an external surface such as a human body, comprising a metallic container body extending along a longitudinal axis from a closed bottom end to an open top end; at least one arcuate-shaped sidewall of the container body that defines an upper opening with a first diameter and a lower opening with a second diameter; a roller sphere positioned in the open top end of the container body and seated at least partially between the upper opening and the lower opening of the at least one arcuate-shaped sidewall to define a chamber between the roller sphere and the at least one arcuate-shaped sidewall, the roller sphere having a first extended position and a second depressed position; wherein, in the first extended position, the roller sphere is seated against the upper opening of the at least one arcuate-shaped sidewall, and the chamber is in communication with the container and can receive a product stored in the container; wherein, in the second depressed position, the roller sphere is seated against the lower opening of the at least one arcuate-shaped sidewall, and the chamber is no longer in communication with the product stored in the container, and wherein the roller sphere rotates to allow the application of the product in the chamber to an external surface.

In some embodiments, the roller sphere has an outer diameter larger than the first and second diameters and smaller than a maximum diameter of the chamber. In various embodiments, the outer diameter of the roller sphere is between approximately 0.8% to 1.3% larger than the first diameter of the upper opening. In some embodiments, the outer diameter of the roller sphere is approximately 25 mm, and the first diameter of the upper opening is between approximately 24.7 mm to 24.8 mm. In various embodiments, the container further comprises a shoulder extending from an outer surface of the container body proximate to the open top end of the container. In some embodiments, the container further comprises a cap having an inwardly-extending curl that defines a cap opening, wherein the cap is configured to selectively engage the shoulder of the container body such that the curl forms an interference fit with the shoulder, and the cap covers the roller sphere.

In various embodiments, the first diameter is larger than the second diameter. In some embodiments, the maximum diameter of the chamber is approximately 5.4% larger than the outer diameter of the roller sphere. In various embodiments, the maximum diameter of the chamber is approximately 26.43 mm, and the outer diameter of the roller sphere is approximately 25 mm. In some embodiments, the maximum diameter of the chamber is offset from the upper opening along the axis by a predetermined distance, wherein the predetermined distance is approximately 2.92 mm. In various embodiments, wherein the container body is an aluminum alloy, and the roller sphere is one of a plastic material and an aluminum material or combinations therein.

Another particular embodiment of the present disclosure is a method for manufacturing a metallic roll-on container, comprising (i) forming a slug with a metallic material; (ii) impact extruding the slug to form a container body, wherein the container body extends from a closed bottom end to an open top end; (iii) forming arcuate-shaped sidewalls at the top end of the container body that define an upper opening with a first diameter and define a lower opening with a second diameter; and (iv) pressing a roller sphere into the sidewalls to deflect the sidewalls and position the roller sphere in the container body, the roller sphere and the sidewalls defining a chamber positioned between the upper and lower openings, wherein the roller sphere has an outer diameter that is larger than the first and second diameters and smaller than a maximum diameter of the chamber.

In some embodiments, the method further comprises (v) melting and casting the metallic material into a slab; (vi) rolling the slab to a predetermined thickness; (vii) cooling the slab at an ambient temperature between approximately 59° F. to 122° F.; (viii) punching the slug from the cooled slab; and (ix) annealing the slug, wherein a peak temperature of the slug is between approximately 842° F. to 1058° F. In various embodiments, the method further comprises (x) providing a scrap metallic material; (xi) melting the scrap metallic material with a 1070 aluminum alloy to form the metallic material, wherein the metallic material comprises between 97.70 wt. % aluminum and 98.50 wt. % aluminum, between 0.16 wt. % Si and 0.24 wt. % Si, between 0.37 wt. % Fe and 0.48 wt. % Fe, between 0.08 wt. % Cu and 0.15 wt. % Cu, between 0.48 wt. % Mn and 0.71 wt. % Mn, between 0.34 wt. % Mg and 0.52 wt. % Mg, between 0.06 wt. % Zn and 0.12 wt. % Zn, between 0.01 wt. % Cr and 0.04 wt. % Cr, and between 0.00 wt. % Ti and 0.04 wt. % Ti.

In some embodiments, approximately 60% of the metallic material is the scrap metallic material and approximately 40% of the metallic material is the 1070 aluminum alloy. In various embodiments, the scrap metallic material comprises at least one of a 3104, a 3004, a 3003, a 3103, a 3013 or a 3105 aluminum alloy. In some embodiments, a titanium boride material is added to the scrap metallic material.

In various embodiments, the method further comprises (xii) forming a shoulder on an outer surface of the container body; (xiii) forming an inward curl on a cap that defines a cap opening; and (xiv) pressing the cap onto the shoulder such that the curl forms an interference fit with the shoulder, and the cap covers the roller sphere. In some embodiments, the method further comprises (xv) annealing the slug within a furnace at a temperature between approximately 1,000° F. to 1,112° F. for between approximately 5 hours to 9 hours. In various embodiments, the method further comprises (xvi) trimming at least a portion of the container body after the impact extruding.

In some embodiments, the method further comprises (xvii) moving the roller sphere to an extended position against the upper opening where the chamber forms a continuous volume with a container volume of the container body such that the chamber can receive a product stored in the container volume; and (xviii) moving the roller sphere to a depressed position against the lower opening where the chamber forms a continuous volume with an external environment such that the product from the chamber can be applied to the roller sphere as the roller sphere rotates against an external surface.

A further specific embodiment of the present disclosure is a metallic roll-on container for applying a product onto an external surface, comprising a metallic container body extending along a longitudinal axis from a closed bottom end to an open top end; at least one arcuate-shaped sidewall of the container body that defines an upper opening with a first diameter, a lower opening with a second diameter, and a maximum inner diameter between the upper and lower openings; a roller sphere positioned in the open top end of the container body and seated at least partially between the upper opening and the lower opening to define a chamber between the roller sphere and the at least one arcuate-shaped sidewall, wherein a diameter of the roller sphere is greater than the first diameter and greater than the second diameter, and the diameter of the roller sphere is less than the maximum inner diameter; wherein, in a first extended position, the roller sphere is seated against the upper opening of the at least one arcuate-shaped sidewall, and the chamber is in fluid communication with the container and can receive a product stored in the container; and wherein, in a second depressed position, the roller sphere is seated against the lower opening of the at least one arcuate-shaped sidewall, and the chamber is no longer in fluid communication with the product stored in the container, and wherein the roller sphere rotates to allow the application of the product in the chamber to an external surface.

In some embodiments, the metallic container body comprises an aluminum material, and the diameter of the roller sphere is between approximately 0.8% to 1.3% larger than the first diameter of the upper opening. In various embodiments, the metallic container body comprises an aluminum material, the diameter of the roller sphere is approximately 25 mm, and the first diameter of the upper opening is between approximately 24.7 mm to 24.8 mm. In some embodiments, the maximum inner diameter is between approximately 2% and 3% larger than the diameter of the roller sphere. In various embodiments, the first diameter is larger than the second diameter such that a larger portion of the roller sphere extends above the upper opening than below the lower opening. In some embodiments, the container further comprises a shoulder extending from an outer surface of the container body, wherein the shoulder is configured to selectively receive a cap with an interference fit, and the cap presses the roller sphere into the second depressed position when the cap is received on the shoulder.

Another particular embodiment of the present disclosure is a method for manufacturing a metallic roll-on container for applying a product onto an external surface, comprising (xix) forming a container body from a slug of metallic material, wherein the container body extends from a closed bottom end to an open top end, and the container body has at least one arcuate-shaped sidewall that defines an upper opening at the top end with a first diameter, a lower opening with a second diameter; (xx) providing a roller sphere having an outer diameter that is larger than the first diameter of the upper opening; (xxi) pressing a roller sphere into the at least one sidewall at the upper opening to deform the at least one sidewall such that the first diameter increases to match the outer diameter of the roller sphere; and (xxii) releasing an elastic portion of the deformation of the at least one sidewall after the roller sphere passes through the upper opening such that the outer diameter of the roller sphere remains larger than the first diameter of the upper opening, and the roller sphere is retained within the container body.

In some embodiments, the forming the container body comprises impact extruding the slug of the metallic material. In various embodiments, the method further comprises (xxiii) trimming at least a portion of the container body after the impact extruding. In some embodiments, the method further comprises (xxiv) melting and casting the metallic material into a slab; (xxv) rolling the slab to a predetermined thickness; (xxvi) cooling the slab at an ambient temperature between approximately 59° F. to 122° F.; (xxvii) punching the slug from the cooled slab; and (xxviii) annealing the slug, wherein a peak temperature of the slug is between approximately 842° F. to 1058° F. In some embodiments, the method further comprises (xxix) providing a scrap metallic material; (xxx) melting the scrap metallic material with a 1070 aluminum alloy to form the slug of metallic material having between 97.70 wt. % aluminum and 98.50 wt. % aluminum, between 0.16 wt. % Si and 0.24 wt. % Si, between 0.37 wt. % Fe and 0.48 wt. % Fe, between 0.08 wt. % Cu and 0.15 wt. % Cu, between 0.48 wt. % Mn and 0.71 wt. % Mn, between 0.34 wt. % Mg and 0.52 wt. % Mg, between 0.06 wt. % Zn and 0.12 wt. % Zn, between 0.01 wt. % Cr and 0.04 wt. % Cr, and between 0.00 wt. % Ti and 0.04 wt. % Ti.

In various embodiments, the method further comprises (xxxi) forming a shoulder on an outer surface of the container body; (xxxii) forming an inward curl on a cap that defines a cap opening; and (xxxiii) pressing the cap onto the shoulder such that the curl forms an interference fit with the shoulder, and the cap presses the roller sphere into the lower opening. In some embodiments, the metallic container body comprises an aluminum material, and the diameter of the roller sphere is between approximately 0.8% to 1.3% larger than the first diameter of the upper opening. In various embodiments, the method further comprises (xxxiv) moving the roller sphere to a first extended position, wherein the roller sphere is seated against the upper opening of the at least one arcuate-shaped sidewall, and a chamber between the roller sphere and the at least one arcuate-shaped sidewall is in fluid communication with the container body and can receive a product stored in the container body; and (xxxv) moving the roller sphere to a second depressed position, the roller sphere is seated against the lower opening of the at least one arcuate-shaped sidewall, and the chamber is no longer in fluid communication with the product stored in the container body, and wherein the roller sphere rotates to allow the application of the product in the chamber to an external surface.

A particular embodiment of the present disclosure is a metallic roll-on container system for applying a liquid product onto a user's skin, comprising a metallic container body extending along a longitudinal axis from a closed bottom end to an open top end; at least one arcuate-shaped sidewall of the container body that defines an upper opening with a first diameter, a lower opening with a second diameter, and a maximum inner diameter located between the upper and lower openings; a roller sphere positioned in the open top end of the container body and seated at least partially between the upper opening and the lower opening to define a chamber between the roller sphere and the at least one arcuate-shaped sidewall, wherein a diameter of the roller sphere is greater than the first diameter and greater than the second diameter, and the diameter of the roller sphere is less than the maximum inner diameter; an outwardly-extending shoulder of the metallic container body positioned below the lower opening along the longitudinal axis, the shoulder having a diameter that is larger than the maximum inner diameter; and a cap selectively connected to the shoulder with an interference fit, wherein, when the cap is selectively connected to the shoulder, the cap presses the roller sphere against the lower opening, wherein the metallic container body and the cap are each made of a material having a Young's Modulus greater than 50 GPa.

In some embodiments, the cap has an inwardly-extending curl that defines an opening with an inner diameter that is less than the diameter of the shoulder to form the interference fit. In various embodiments, the system further comprises a first recess extending into an outer surface of the metallic container body, wherein the metallic container body defines the lower opening at the first recess; and a second recess extending into an outer surface of the metallic container body, wherein the curl of the cap extends into the second recess wherein the cap is selectively connected to the metallic container body. In some embodiments, the metallic container body comprises an aluminum material, and the diameter of the roller sphere is between approximately 0.8% to 1.3% larger than the first diameter of the upper opening. In various embodiments, a first distance between the maximum inner diameter to the upper opening along the longitudinal axis is less than a second distance between the maximum inner diameter to the lower opening along the longitudinal axis such that a larger portion of the roller sphere extends above the upper opening than below the lower opening. In some embodiments, the at least one arcuate sidewall comprises a first arcuate sidewall that defines the upper opening and a second arcuate sidewall that defines the lower opening.

Although generally referred to herein as a "bottle," "metallic bottle," "metallic container," "container," "aluminum bottle," "can," and "container," it should be appreciated that the methods and apparatus described herein may be used with containers of any size or shape and that are formed of any material, including, but not limited to metal, plastic, and glass containers including, without limitation, beverage cans and beverage bottles. Further, as will be appreciated by one of skill in the art, the methods and apparatus of the present disclosure may be used for any type of container and are not specifically limited to a beverage container such as a soft drink or beer can.

The terms "metal" or "metallic" as used hereinto refer to any metallic material that may be used to form a container, including without limitation aluminum, steel, tin, and any combination thereof.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about" or "approximately." One skilled in the art will appreciate that these terms, for instance, can imply variation, on a relative basis, of less than 10%.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

The Summary is neither intended, nor should it be construed, as being representative of the full extent and scope of the present disclosure. Moreover, references made herein to "the present disclosure" or aspects thereof should be understood to mean certain embodiments of the present disclosure and should not necessarily be construed as limiting all embodiments to a particular description. The present disclosure is set forth in various levels of detail in the Summary as well as in the attached Drawings and the Detailed Description and no limitation as to the scope of the present disclosure is intended by either the inclusion or non-inclusion of elements or components. Additional aspects of the present disclosure will become more readily apparent from the Detailed Description, particularly when taken together with the Drawings.

BRIEF DESCRIPTION OF THE DRAWINGS

The accompanying Drawings, which are incorporated herein and constitute a part of the specification, illustrate embodiments of the disclosure and together with the Summary given above and the Detailed Description given below serve to explain the principles of these embodiments. In certain instances, details that are not necessary for an understanding of the disclosure or that render other details difficult to perceive may have been omitted. It should be understood, of course, that the present disclosure is not necessarily limited to the particular embodiments illustrated herein. Additionally, it should be understood that the Drawings are not necessarily to scale.

Figure 1:
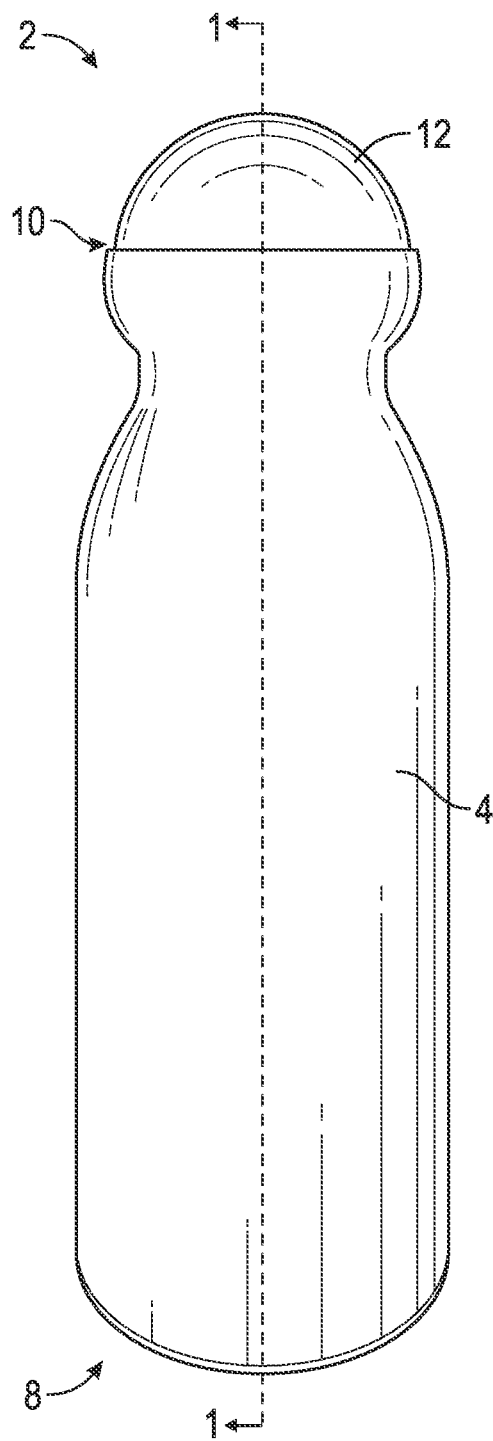
FIG. 1 is a front elevation view of an aluminum roll-on container according to an embodiment of the present disclosure.

To assist in the understanding the present disclosure the following list of components and associated numbering found in the Drawings is provided herein:

| Number | Component |
|---|---|
| 1 | Line |
| 2 | Aluminum Roll-On Container |
| 4 | Body |
| 6 | Line |
| 8 | Closed End |
| 7A | Line |
| 7B | Line |
| 10 | Open End |
| 12 | Roller Sphere |
| 14 | Sidewall |
| 16 | Upper Opening |
| 18 | Lower Opening |
| 20 | Inner Surface |
| 22 | Chamber |
| 24 | Sphere Diameter |
| 26 | Maximum Inner Diameter |
| 28 | Container Volume |
| 30 | Upper Opening Diameter |
| 32 | Outer Dimension |
| 34 | Lower Opening Diameter |
| 36 | Lower Recess Diameter |
| 38 | First Arcuate Sidewall |
| 40 | Transition Sidewall |
| 42 | Second Arcuate Sidewall |
| 44 | First Taper Sidewall |
| 46 | Third Arcuate Sidewall |
| 48 | Shoulder Sidewall |
| 50 | Second Taper Sidewall |
| 52 | Third Taper Sidewall |
| 54 | Recess Sidewall |
| 56 | Fourth Arcuate Sidewall |
| 58 | Fifth Arcuate Sidewall |
| 60 | First Recess |
| 62 | Shoulder |
| 64 | Second Recess |
| 66 | Outermost Diameter |
| 68 | First Recess Diameter |
| 70 | Shoulder Diameter |
| 72 | Second Recess Diameter |
| 74 | Body Diameter |
| 76 | First Arcuate Radius |
| 78 | Second Arcuate Radius |
| 80 | Third Arcuate Radius |
| 82 | Fourth Arcuate Radius |
| 84 | Fifth Arcuate Radius |
| 86 | First Dimension |
| 88 | Second Dimension |
| 90 | Third Dimension |
| 92 | Fourth Dimension |
| 94 | Fifth Dimension |
| 96 | Sixth Dimension |
| 98 | Seventh Dimension |
| 100 | Eighth Dimension |
| 102 | Cap |
| 104 | Curl |
| 106 | Cap Height |
| 108 | Manufacturing process |
| 110 | Forming container |
| 112 | Providing roller sphere |
| 114 | Pressing roller sphere |
| 116 | Deforming container |
| 118 | Releasing deformation |

DETAILED DESCRIPTION

The present disclosure has significant benefits across a broad spectrum of endeavors. It is the Applicant's intent that this specification and the claims appended hereto be accorded a breadth in keeping with the scope and spirit of the disclosure being disclosed despite what might appear to be limiting language imposed by the requirements of referring to the specific examples disclosed. To acquaint persons skilled in the pertinent arts most closely related to the present disclosure, a preferred embodiment that illustrates the best mode now contemplated for putting the disclosure into practice is described herein by, and with reference to, the attached Drawings that form a part of the specification. The exemplary embodiment is described in detail without attempting to describe all of the various forms and modifications in which the disclosure might be embodied. As such, the embodiments described herein are illustrative, and as will become apparent to those skilled in the arts, may be modified in numerous ways within the scope and spirit of the disclosure.

Referring now to FIG. 1, a front elevation view of the aluminum roll-on container 2 is provided. The container 2 in this embodiment comprises a body 4 that generally extends along a longitudinal axis from a closed end 8 to an open end 10. A roller sphere 12 is positioned in the open end 10 to dispense product stored within the container 2 onto an external surface. For instance, a deodorant product can be stored within the container 2, and movement of the roller sphere 12 at the open end 10 coats part of the roller sphere 12 with the deodorant product. Then, a user can move the container 2 such that the roller sphere 12 rotates at the open end 10, and the deodorant product is transferred from the roller sphere 12 to the skin of the user. It will be appreciated that the roller sphere 12 can be made from a variety of materials including aluminum, plastic, etc. It will be further appreciated that the product stored in the container 2 can include sunscreen, insect repellant, lotion, pressurized contents, non-pressurized contents, etc. Moreover, while the roller sphere 12 is depicted as a smooth sphere, the present disclosure encompasses embodiments where the roller sphere 12 has, for example, a textured surface such as a dimpled surface that helps retain product received from the within the container 2.

Figure 2:
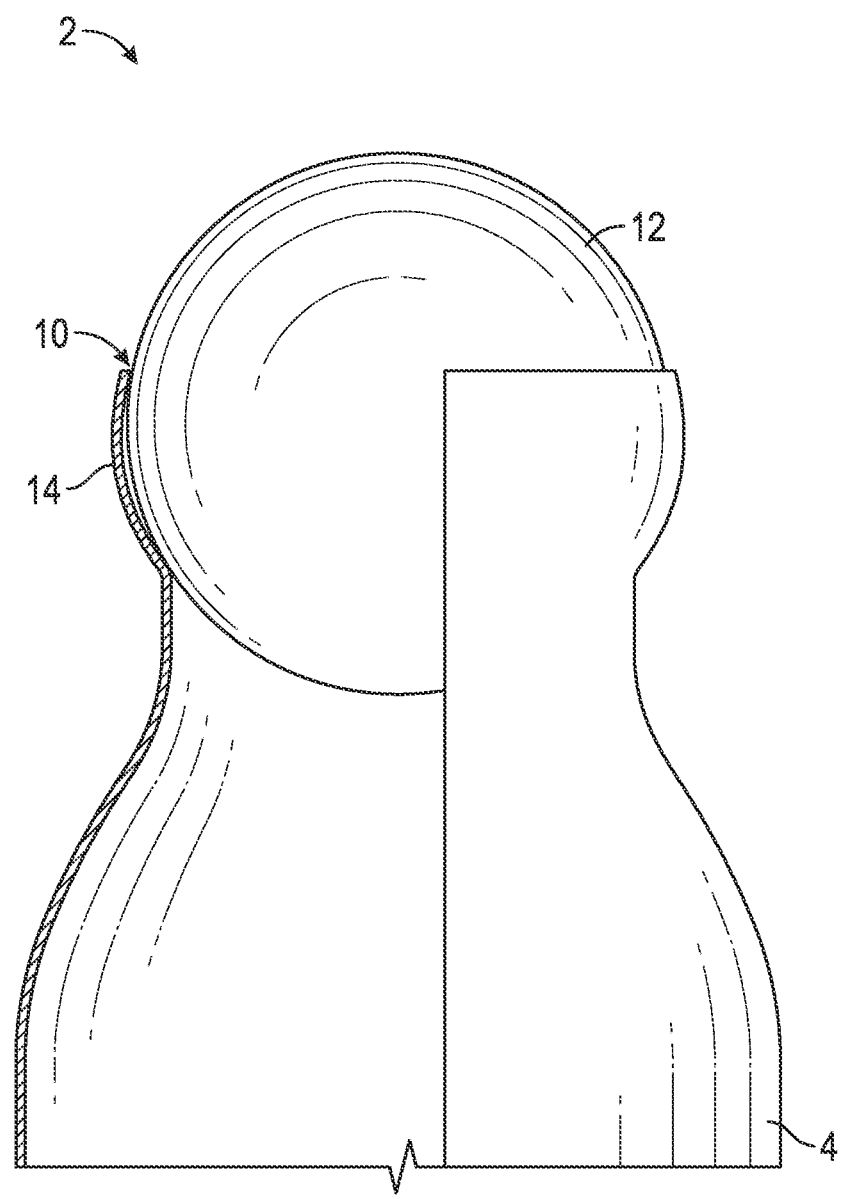
FIG. 2 is a partial, cross-sectional view of an aluminum roll-on container partially taken along line 1-1 of FIG. 1 according to an embodiment of the present disclosure.

Referring now to FIG. 2, a partial cross-sectional view of the container 2 is provided. The cross-section is taken partially along line 1-1 of FIG. 1 such that a quarter of the container 2 is removed to reveal more of the roller sphere 12. An arcuate sidewall 14 is formed at the open end 10 of the container 2, and the roller sphere 12 is positioned within the arcuate sidewall 14. The arcuate sidewall 14 can be described as a single sidewall 14 or a plurality of sidewalls that circumscribe the roller sphere 12. As described in further detail below, the arrangement between the roller sphere 12 and the arcuate sidewall 14 allows product stored in the container 2 to move into a chamber between the roller sphere 12 and the arcuate sidewall 14. Then, the roller sphere 12 can transfer the product to an external surface.

Figures 3A, 3B:
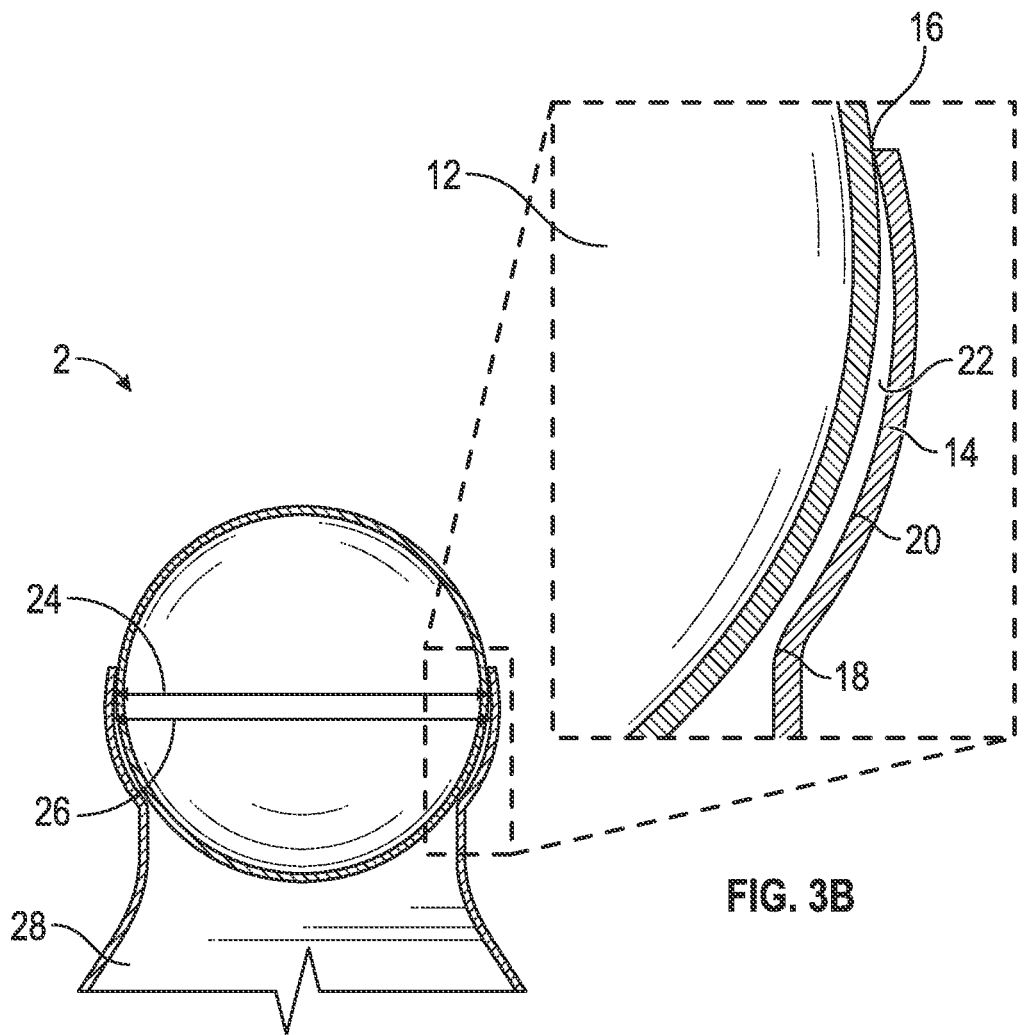
FIG. 3A is a cross-sectional view of an aluminum roll-on container taken along line 1-1 of FIG. 1 with a roller sphere in a first position according to an embodiment of the present disclosure.
FIG. 3B is a detailed view of a portion of FIG. 3A according to an embodiment of the present disclosure.
Figures 4A, 4B:
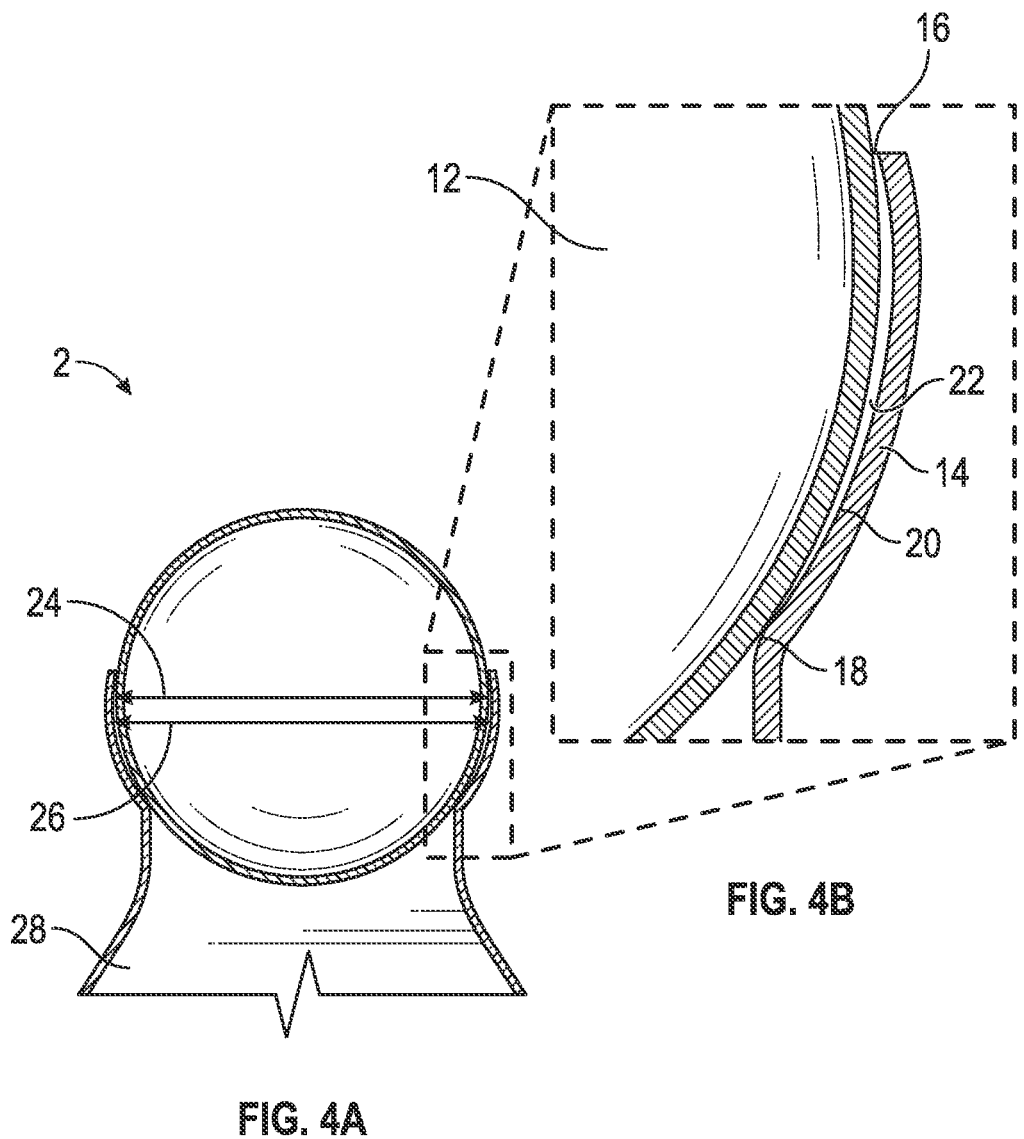
FIG. 4A is a cross-sectional view of an aluminum roll-on container taken along line 1-1 of FIG. 1 with a roller sphere in a second position according to an embodiment of the present disclosure.
FIG. 4B is a detailed view of a portion of FIG. 4A according to an embodiment of the present disclosure.

Referring now to FIGS. 3A-4B, cross-sectional views of the arcuate sidewall 14 and the roller sphere 12 taken along line 1-1 of FIG. 1 are depicted in a first position and a second position. As shown in FIGS. 3A and 3B, the roller sphere 12 is in a first, upward position to move product into a chamber 22 between the roller sphere 12 and the arcuate sidewall 14. As shown in FIGS. 4A and 4B, the roller sphere 12 is in a second, downward position to apply product to an external surface. The arcuate sidewall 14 defines an upper opening 16 and a lower opening 18 within the container, and the roller sphere 12 and an inner surface 20 of the arcuate sidewall 14 define a chamber 22 positioned between the upper opening 16 and the lower opening 18. The upper opening 16 serves as the opening for the container 2, and the lower opening 18 joins the chamber 22 with a container volume 28 that stores a product. The chamber 22 of the container 2 generally receives the roller sphere 12, though portions of the roller sphere 12 extend into the container volume 28 and into the external environment.

Also depicted is the diameter 24 of the roller sphere 12 which, as described in more detail below, allows the roller sphere 12 to be retained within the container 2 while moving within the container 2. Specifically, the diameter of the roller sphere 12 is greater than the diameter of the upper opening 16 but less than the maximum inner diameter 26 of the chamber 22 as defined by the arcuate sidewall 14. In various embodiments the diameter 24 is between approximately 23 and 27 mm. In some embodiments, the diameter 24 is approximately 25 mm.

In addition, the diameter of the lower opening 18 can be smaller than the diameter of the upper opening 16 to expose more of the roller sphere 12 to an external environment. In the example of deodorant, a limited area of the roller sphere 12 that is exposed to the external environment would result in less transfer the deodorant product from the roller sphere 12 to the skin. With the depicted relationship between the diameters of the openings 16, 18, a greater area of the roller sphere 12 is exposed to the external environment to contact more skin or other surfaces. Yet, the upper opening 16 cannot be so large as to interfere with the assembly process or to let the roller sphere 12 fall out. Thus, in some embodiments, the diameter of the upper opening 16 is between approximately 15% and 18% larger than the diameter of the lower opening 18. In various embodiments, the diameter of the upper opening 16 is approximately 16.7% larger than the diameter of the lower opening 18 to achieve the above functions while avoiding the above issues.

The roller sphere 12 in FIGS. 3A and 3B is in a first position such that the roller sphere 12 is seated against the upper opening 16. This can be accomplished in many different ways, including inverting the container 2 such that gravity pulls the roller sphere 12 against the upper opening 16. Similarly, the container volume 28 can be pressurized to bias the roller sphere 12 against the upper opening 16. Further still, a user can shake the container 2 to at least temporarily move the roller sphere 12 against the upper opening 16. With the roller sphere 12 seated against the upper opening 16, the chamber 22 forms a continuous volume with the container volume 28. This allows product stored in the container volume 28 to move into the chamber 22.

The roller sphere 12 in FIGS. 4A and 4B is in a second position such that the roller sphere 12 is seated against the lower opening 18. This can be accomplished by pressing the roller sphere 12 against an external surface such as skin. Now the chamber 22 forms a continuous volume with an external environment, and the product that is in the chamber 22 can coat part of the roller sphere 12 as the roller sphere 12 rotates against an external surface. This arrangement also limits the amount of product that can be used since, generally, only the product transferred to the chamber 22 coats the roller sphere 12. As a result, the product is meted out in a controlled manner, which conserves the limited supply of product stored in the container 2.

Figure 5:
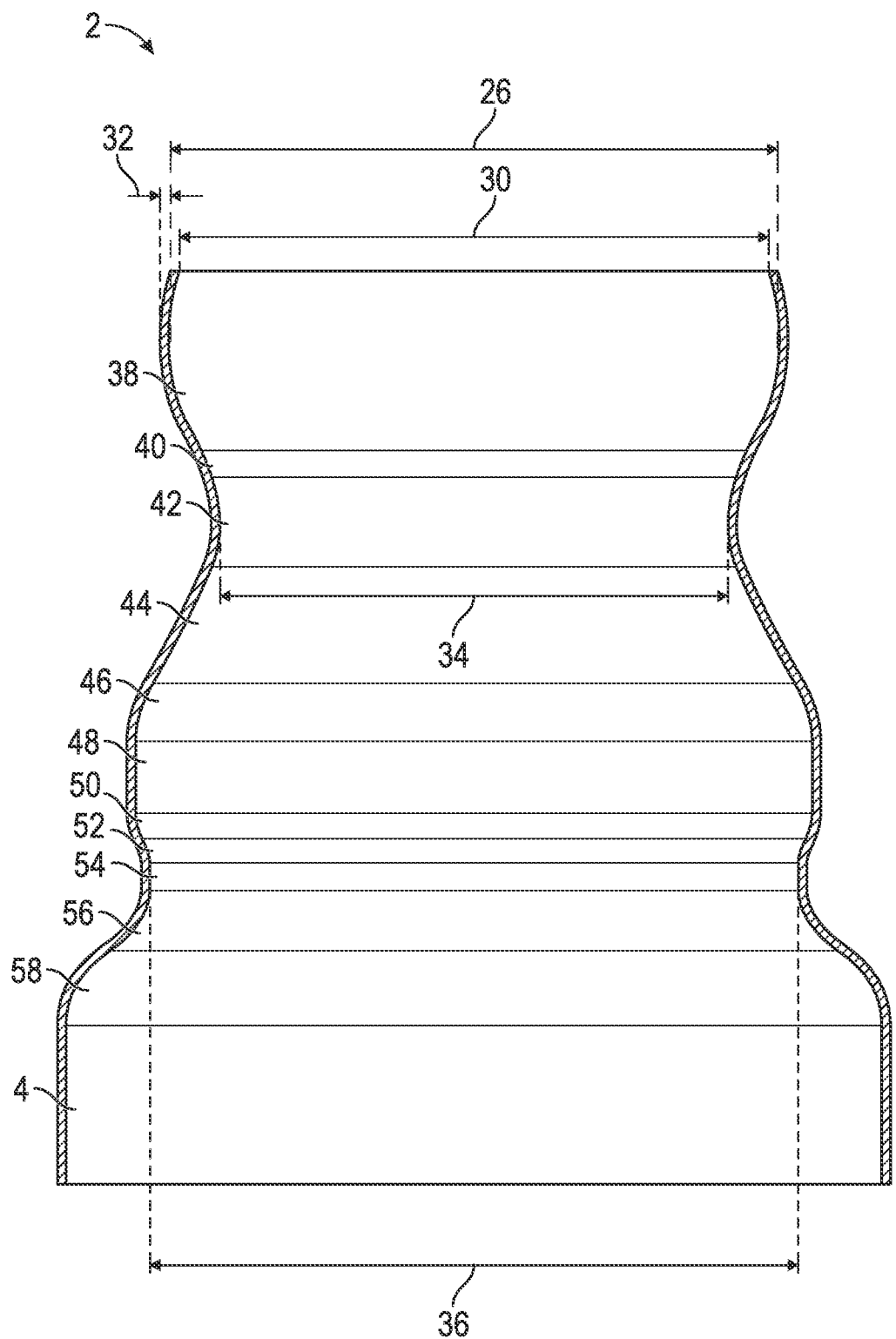
FIG. 5 is a cross-sectional view of an aluminum roll-on container taken along line 6-6 of FIG. 6 according to an embodiment of the present disclosure.
Figure 6:
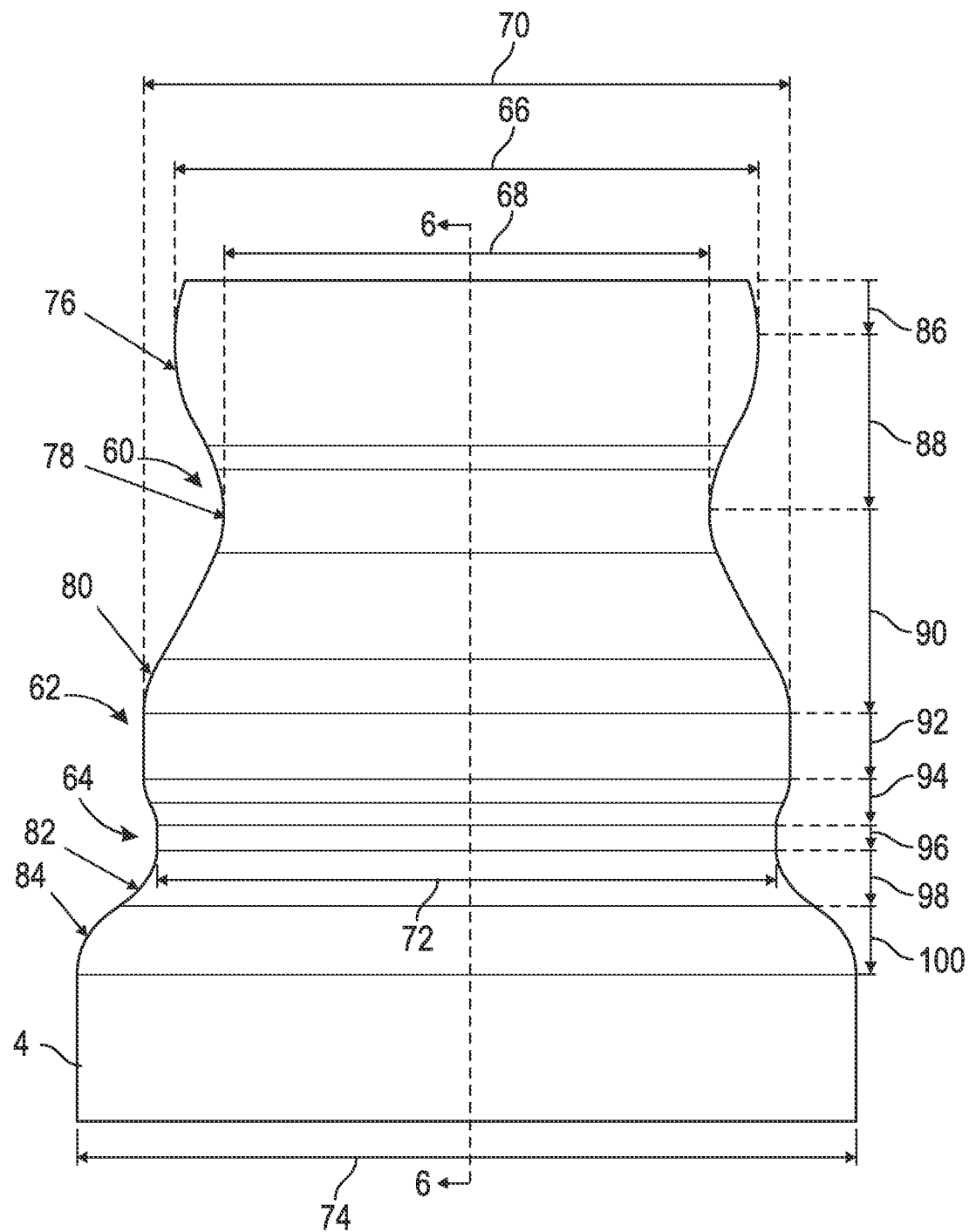
FIG. 6 is a front elevation view of the aluminum roll-on container of FIG. 5 according to an embodiment of the present disclosure.

Now referring to FIGS. 5 and 6, a cross-sectional view and an elevation view of another embodiment of the container 2 are provided, respectively. The cross-section in FIG. 5 is taken along line 6-6 shown in FIG. 6. These figures depict aspects of the container 2 that allow various components to function as described herein. For example, since the roller sphere is larger than the upper opening, and the roller sphere is pressed through the upper opening to assemble the container, the sidewall that defines the upper opening will deform until the diameter of the upper opening is temporarily the same as the diameter of the roller sphere. For a material like aluminum, or a material that at least partially comprises aluminum, the relative sizes between the roller sphere and upper opening are critical for allowing for at least some elastic deformation of the sidewall of the container as the roller sphere enters the container and a sufficient amount of spring back from the aluminum material of the sidewall to retain the roller sphere within the container.

In various embodiments, the diameter of the roller sphere is approximately 0.8% to 1.3% larger than the diameter of the upper opening 30 defined by the arcuate sidewall. In some embodiments, the diameter of the roller sphere is approximately 1% larger than the diameter of the upper opening 30 defined by the arcuate sidewall. Stated differently, the diameter of the upper opening 30 is between approximately 98.8% and 99.2% of the diameter of the roller sphere in various embodiments. In some embodiments, the diameter of the upper opening 30 is approximately 99% of the diameter of the roller sphere. In further embodiments, the diameter of the upper opening 30 is between approximately 92% to 96% of the diameter of the roller sphere. In various embodiments, the diameter of the roller sphere can be approximately 25 mm, and the diameter of the upper opening is at least 24.7 mm. In various embodiments, the upper opening diameter 30 is between approximately 23 mm and 26 mm. In some embodiments, the upper opening diameter 30 is between approximately 24.7 mm and 24.8 mm. In various embodiments, the upper opening diameter is approximately 24.75 mm. It will be appreciated that further embodiments of the present disclosure can include a roller sphere having a diameter, for instance, between approximately 20 mm and 40 mm in accordance with the relative relationships described herein.

In a further example, the relationship between the roller sphere and the maximum inner diameter 26 of the arcuate sidewall is important, even critical, to the movement of the roller sphere between first and second positions. In some embodiments, the maximum inner diameter 26 is between approximately 23 mm and 28 mm, and in various embodiments, the maximum inner diameter 26 is approximately 25.6 mm when the roller sphere has a diameter of 25 mm. It will be appreciated that the diameter of the roller sphere and the maximum inner diameter 26 can be expressed in relative terms to allow the roller sphere to move between positions once assembled with the container body, where the maximum inner diameter 26 is between approximately 1% and 4% larger that the diameter of the roller sphere. In various embodiments, the maximum inner diameter 26 is approximately 2.4% larger than the diameter of the roller sphere. In some embodiments, an outer dimension 32 is between approximately 0.35 mm and 0.55 mm, and in various embodiments, the outer dimension 32 is approximately 0.43 mm.

In the embodiment depicted in FIGS. 5 and 6, the first arcuate sidewall 38 establishes these dimensions 26, 30, 32, and a second arcuate sidewall 42 establishes a recess at an outer surface and defines a lower opening at an inner surface where the lower opening interacts with the roller sphere as described herein. A transition sidewall 40 can join the first and second arcuate sidewalls 38, 42. In various embodiments, the lower opening diameter 34 is between approximately 19 mm and 23 mm. In some embodiments, the lower opening diameter 34 is approximately 21.2 mm. At a lower end, the second arcuate sidewall 42 joins a first taper sidewall 44, which extends outwardly and joins a third arcuate sidewall 46. The third arcuate sidewall 46, a shoulder sidewall 48, and a second taper sidewall 50 generally define a shoulder where the shoulder sidewall 48 is substantially parallel with a longitudinal axis of the container 2. A third taper sidewall 52 tapers inwardly and joins a recess sidewall 54, which is substantially parallel with a longitudinal axis of the container 2. The recess sidewall 54 defines a second recess at an outer surface and a lower recess diameter 36 at an inner surface. In some embodiments, the lower recess diameter 36 is between approximately 25 mm and 30 mm. In various embodiments, the lower recess diameter 36 is approximately 27.34 mm. Finally, a fourth arcuate sidewall 56 and a fifth arcuate sidewall 58 extend outwardly to join the remaining body 4 of the container 2.

FIG. 6 is an elevation view of a container 2 where further diameters are shown. For instance, an outermost diameter 66 is defined by the first arcuate sidewall, and in some embodiments, the outermost diameter 66 is between approximately 24 mm and 28 mm. In various embodiments, the outermost diameter 66 is approximately 26.46 mm. Below this diameter 66, the sidewalls define a first recess 60, a shoulder 62, and a second recess 64. In some embodiments, the first recess diameter 68 is between approximately 20 mm and 24 mm. In various embodiments, the first recess diameter 68 is approximately 22.2 mm. In some embodiments, the shoulder diameter 70 is between approximately 28 mm and 32 mm. In various embodiments, the shoulder diameter 72 is approximately 29.3 mm. In some embodiments, the second recess diameter 72 is between approximately 26 mm and 30 mm. In various embodiments, the second recess diameter 72 is approximately 28.2 mm. In some embodiments, a diameter 74 of the remaining body 4 is between approximately 30 mm and 40 mm. In various embodiments, the body diameter 74 is approximately 35 mm.

These features and components, including their absolute dimensions and dimensions relative to each other, can serve various functions of the container. Generally, the first recess 60 defines the diameter of the lower opening within the container. The shoulder diameter 70 is larger than the outermost diameter 66 to provide clearance for a cap that selectively connects to the shoulder. Moreover, the shoulder 62 is positioned between two recesses 60, 64 to help a user located a cap on the shoulder 62 and to also add rigidity to the shoulder 62 that may experience many selective connections of a cap over the life of the container. The rigidity is added by a sidewall that extends inwardly from an upper edge of the shoulder sidewall and a sidewall that extends inwardly from a lower edge of the shoulder sidewall. These sidewalls buttress and support the shoulder sidewall to increase the rigidity of the overall shoulder. In this sense, the shoulder 62 has a higher rigidity than the curl of the cap, as described in greater detail below. The second recess 64, as described in further detail below can receive part of a curl of the cap to help secure the cap to the shoulder 62.

FIG. 6 also shows the various radii of curvature along which the arcuate sidewalls extend. In some embodiments, the first arcuate sidewall extends along a radius 76 between approximately 8 mm and 12 mm. In some embodiments, the radius 76 is approximately 9.55 mm. In various embodiments, the second arcuate sidewall extends along a radius 78 between approximately 4 mm and 7 mm. In some embodiments, the radius 78 is approximately 5.31 mm. In various embodiments, the third arcuate sidewall extends along a radius 80 between approximately 3 mm and 7 mm. In some embodiments, the radius 80 is approximately 5 mm. In various embodiments, the fourth arcuate sidewall extends along a radius 82 between approximately 1 mm and 5 mm. In some embodiments, the radius 82 is approximately 2.5 mm. In various embodiments, the fifth arcuate sidewall extends along a radius 84 between approximately 2 mm and 6 mm. In some embodiments, the radius 82 is approximately 4 mm.

In addition, FIG. 6 shows various dimensions 86, 88, 90, 92, 94, 96, 98, 100 of points along the sidewalls relative to the top surface of the container 2. Thus, for instance, a first dimension 86 and an eighth dimension 100 are both measured from the top surface of the container 2. In various embodiments, a first dimension 86 to an outermost diameter of the first arcuate sidewall is between approximately 2 mm and 4 mm. In some embodiments, the first dimension 86 is approximately 2.75 mm. The outermost diameter corresponds to the maximum inner diameter defined by an inner surface of the arcuate sidewall, and this offset of the maximum inner diameter from the upper surface helps retain the roller sphere within the container body. In various embodiments, a second dimension 88 to the narrowest diameter of the first recess is between approximately 8 mm and 13 mm. In some embodiments, the second dimension 88 is approximately 10.41 mm. In some embodiments, the second dimension 88 is greater than twice the first dimension 86 such that a larger portion of the roller sphere extends above the upper opening than below the lower opening. In various embodiments, a third dimension 90 to an upper edge of the shoulder sidewall is between approximately 18 mm and 22 mm. In some embodiments, the third dimension 90 is approximately 19.91 mm. In various embodiments, a fourth dimension 92 to a lower edge of the shoulder sidewall is between approximately 21 mm and 25 mm. In some embodiments, the fourth dimension 92 is approximately 22.99 mm.

In various embodiments, a fifth dimension 94 to an upper edge of the recess sidewall is between approximately 23 mm and 27 mm. In some embodiments, the fifth dimension 94 is approximately 25.01 mm. In various embodiments, a sixth dimension 96 to a lower edge of the recess sidewall is between approximately 24 mm and 28 mm. In some embodiments, the sixth dimension 96 is approximately 26.2 mm. In various embodiments, a seventh dimension 98 to an inflection point between the fourth and fifth arcuate sidewalls is between approximately 26 mm and 30 mm. In some embodiments, the seventh dimension 98 is approximately 28.4 mm. In various embodiments, an eighth dimension 100 to the remaining body of the container 2 is between approximately 29 mm and 34 mm. In some embodiments, the eighth dimension 100 is approximately 31.91 mm.

Figure 7A:
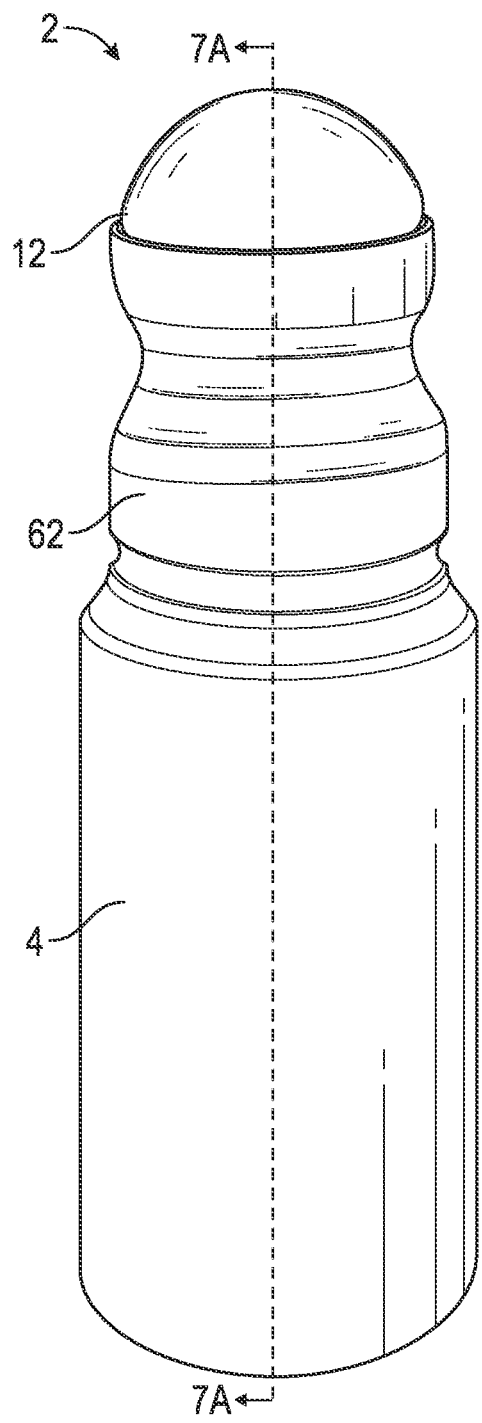
FIG. 7A is a front view of the aluminum roll-on container of FIG. 5 according to an embodiment of the present disclosure.
Figure 7B:
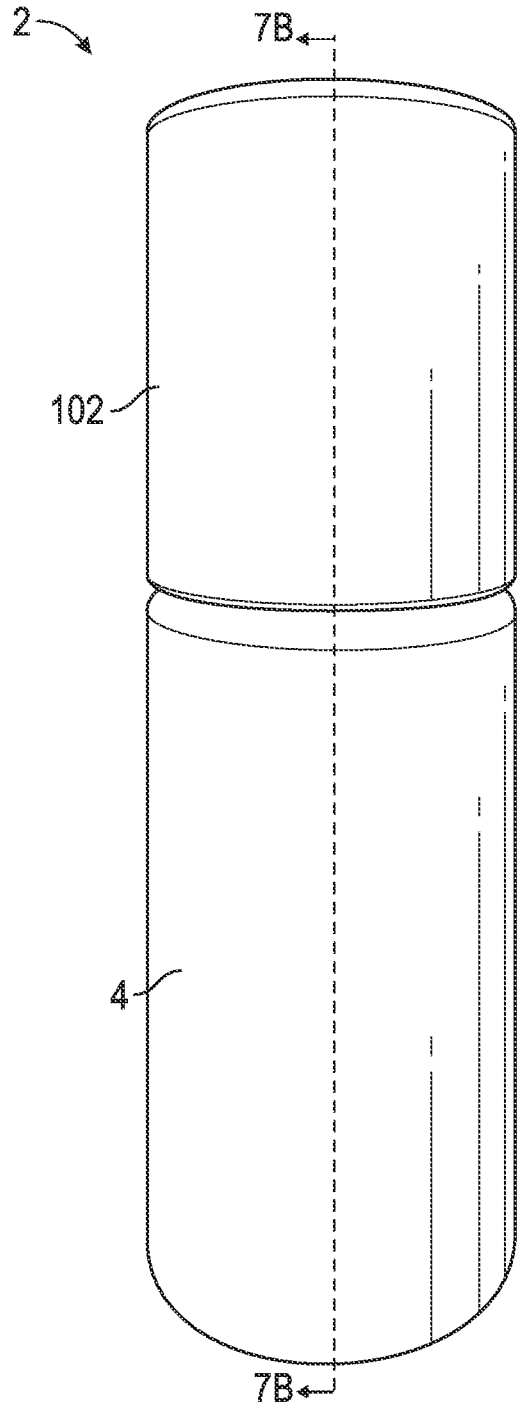
FIG. 7B is a front view of the aluminum roll-on container of FIG. 5 with a cap according to an embodiment of the present disclosure.

Now referring to FIGS. 7A and 7B, perspective views of a container without and with a cap 102 are provided, respectively. An exposed roller sphere can dehydrate a product such as deodorant and inhibit operation of the aluminum roll-on container. A cap 102 positioned over the roller sphere while the aluminum roll-on container is not in operation can help prevent evaporation or slow down dehydration of a product stored in the container. A shoulder 62 is formed on an outer surface of the container 2, and the cap 102 can selectively connect to the shoulder 62 in an interference fit to at least reduce evaporation or dehydration of the product.

Figure 8A:
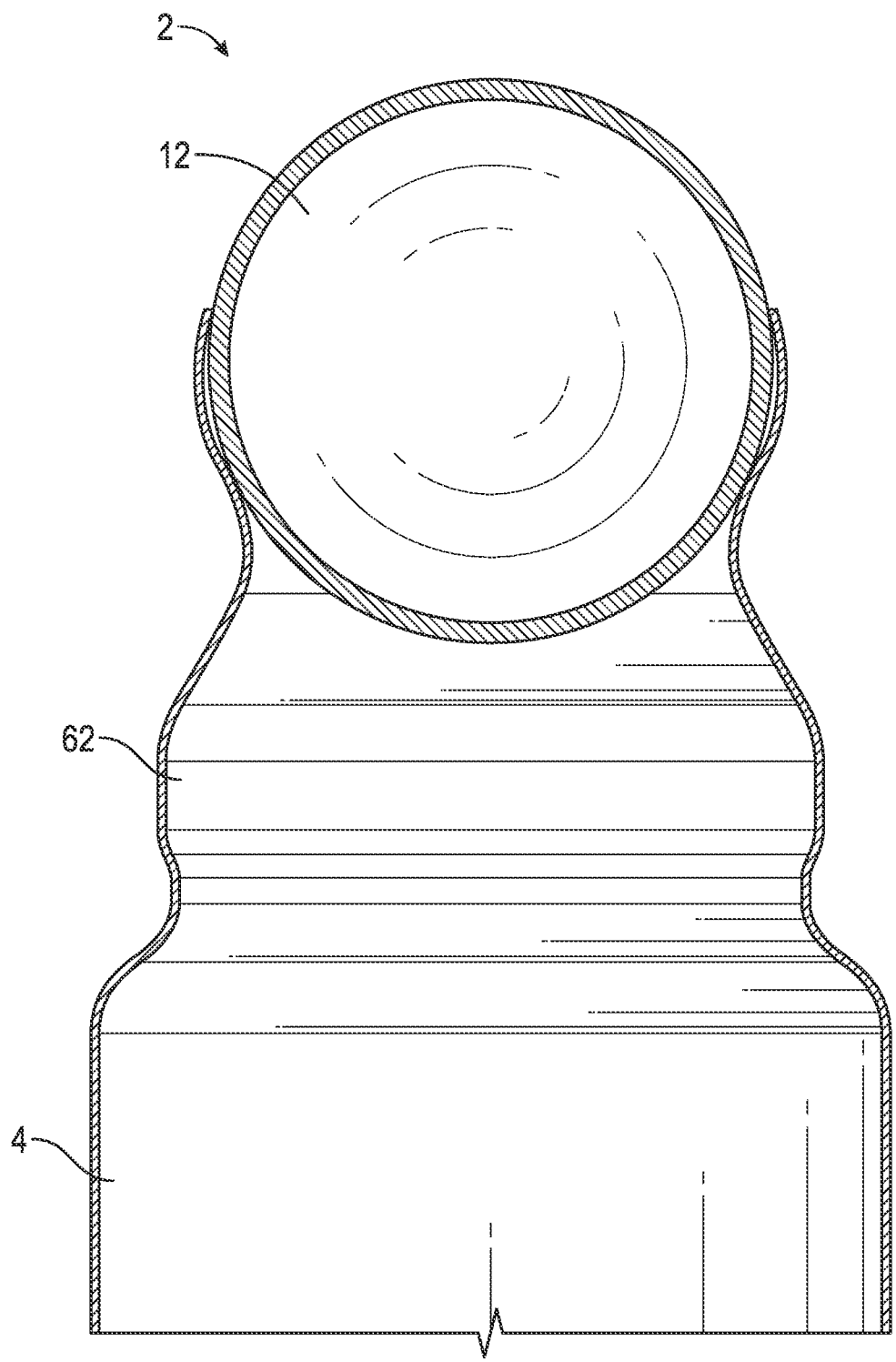
FIG. 8A is a cross-sectional view of an aluminum roll-on container taken along line 7A-7A of FIG. 7A according to an embodiment of the present disclosure.
Figure 8B:
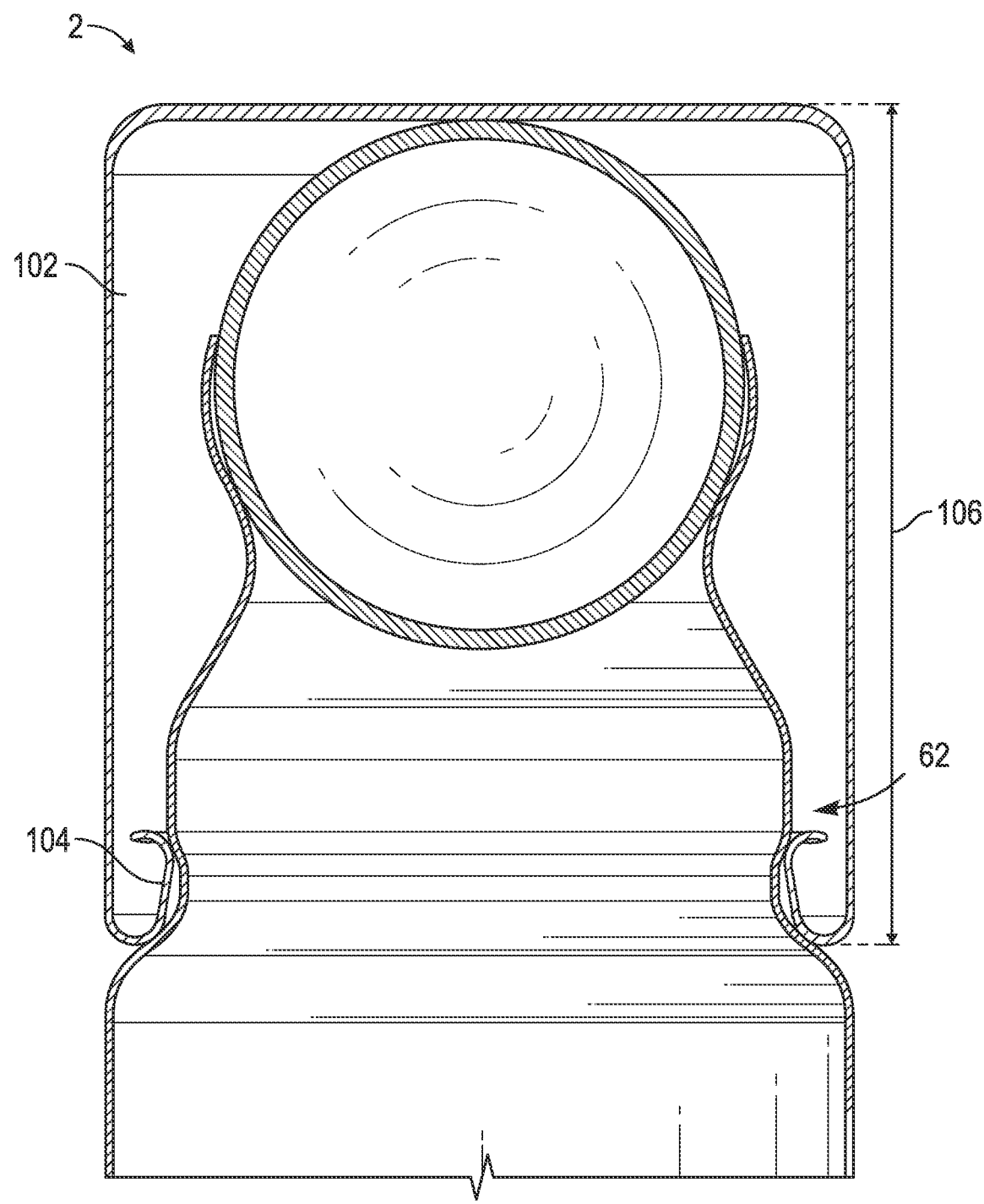
FIG. 8B is a cross-sectional view of an aluminum roll-on container taken along line 7B-7B of FIG. 7B according to an embodiment of the present disclosure.

Referring now to FIGS. 8A and 8B, cross-sectional views of a container 2 without and with a cap 102 are provided, respectively. The cross-section in FIG. 8A is taken along line 7A-7A of FIG. 7A, and the cross-section in FIG. 8B is taken along line 7B-7B of FIG. 7B. The cap 102 has an opening at a lower end that is defined by an inwardly-extending curl 104, which provides resiliency or elasticity to the end of the cap 102 when the cap 102 is placed on the shoulder of the container. Thus, the shoulder has a diameter that is larger than the diameter of the opening of the cap 102, and the inward curl 104 of the cap 102 can deflect to form an interference fit with the container 2 and retain the cap 102 on the container 2. Specifically, the curl 104 is supported at one end, the lowermost end of the cap 102, and not support at an opposing end. Thus, the curl 104 deflects in when engaged with the shoulder of the container, which is supported and is a more rigid structure. The cap 102 can be made from a variety of materials including aluminum, plastic, etc.

When the cap 102 is in the position shown in FIG. 8B the curl 104 is selectively connected to the shoulder. More specifically, the curl 104 is partially positioned in the recess below the shoulder 62, and the curl 104 contacts a lower edge of the shoulder 62. The height 106 of the cap 102 is selected such that an inner surface of the cap 102 contacts the roller sphere to press the roller sphere against the lower opening and preserve the contents of the container.

In addition, it will be appreciated that the roll-on container, including the various aspects of the container such as the arcuate sidewall, can be produced using an impact extrusion process. This process can form a material such as an aluminum into complex shapes. To provide additional background and context regarding the impact extrusion process and forming aluminum into complex shapes, and to further satisfy the written description requirements of 35 U.S.C. § 112, U.S. Pat. No. 9,517,498 is incorporated herein in its entirety by reference. It will be appreciated that embodiments of the present disclosure can be manufactured according to other methods such as drawing and ironing, etc.

Figure 9:
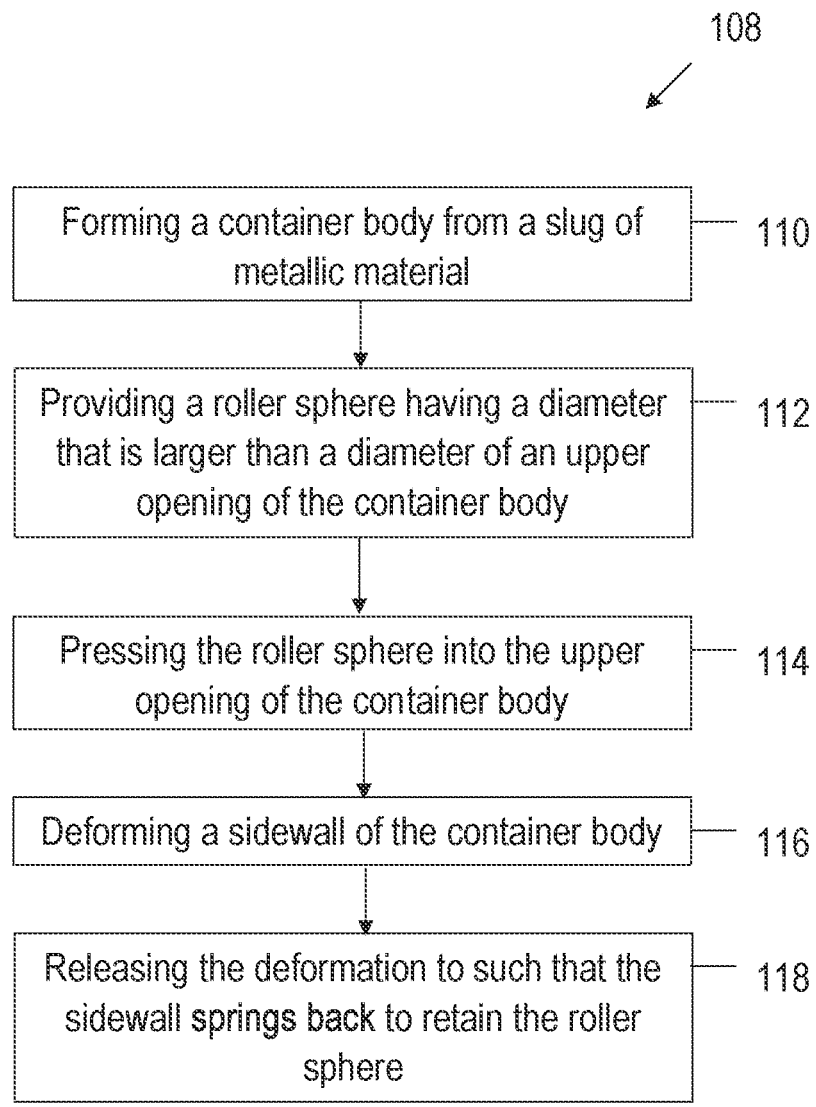
FIG. 9 is a flowchart showing a manufacturing process for producing an aluminum roll-on container according to an embodiment of the present disclosure.

Referring now to FIG. 9, a flowchart showing an exemplary manufacturing process 108 is provided. First, the container is formed 110, for instance, from the impact extrusion of a metal slug. A roller sphere is also provided 112 having the dimensional relationship with the container as described herein. Then, the roller sphere is pressed 114 into the upper opening of the container, which causes at least one sidewall of the container to deform 116. Next, the deformation of the at least one sidewall is released 118 as the roller sphere passes through an upper opening of the container. The at least one sidewall at least partially springs back to a diameter that is smaller than a diameter of the roller sphere to retain the roller sphere.

The description of the present disclosure has been presented for purposes of illustration and description, but is not intended to be exhaustive or limiting of the disclosure to the form disclosed. Many modifications and variations will be apparent to those of ordinary skill in the art. The embodiments described and shown in the figures were chosen and described in order to best explain the principles of the disclosure, the practical application, and to enable those of ordinary skill in the art to understand the disclosure.

While various embodiments of the present disclosure have been described in detail, it is apparent that modifications and alterations of those embodiments will occur to those skilled in the art. Moreover, references made herein to "the present disclosure" or aspects thereof should be understood to mean certain embodiments of the present disclosure and should not necessarily be construed as limiting all embodiments to a particular description. It is to be expressly understood that such modifications and alterations are within the scope and spirit of the present disclosure, as set forth in the following claims.

What is claimed is:

1. A metallic roll-on container for applying a product onto an external surface, comprising:
    a metallic container body extending along a longitudinal axis from a closed bottom end to an open top end, wherein said metallic container body comprises an aluminum material;
    at least one arcuate-shaped sidewall of said metallic container body that defines an upper opening with a first diameter, a lower opening with a second diameter, and a maximum inner diameter between said upper and lower openings;
    a roller sphere positioned in said open top end of said metallic container body and seated at least partially between said upper opening and said lower opening to define a chamber between said roller sphere and said at least one arcuate-shaped sidewall, wherein a diameter of said roller sphere is greater than said first diameter and greater than said second diameter, and said diameter of said roller sphere is less than said maximum inner diameter, wherein said diameter of said roller sphere is between approximately 0.8% to 1.3% larger than said first diameter of said upper opening;
    wherein, in a first extended position, said roller sphere is seated against said upper opening of said at least one arcuate-shaped sidewall, and said chamber is in fluid communication with said container and can receive a product stored in said container; and
    wherein, in a second depressed position, said roller sphere is seated against said lower opening of said at least one arcuate-shaped sidewall, and said chamber is no longer in fluid communication with said product stored in said container, and wherein said roller sphere rotates to allow the application of said product in said chamber to an external surface.

2. The metallic roll-on container of claim 1, wherein said diameter of said roller sphere is approximately 25 mm, and said first diameter of said upper opening is between approximately 24.7 mm to 24.8 mm.

3. The metallic roll-on container of claim 1, wherein said maximum inner diameter is between approximately 2% and 3% larger than said diameter of said roller sphere.

4. The metallic roll-on container of claim 1, wherein said first diameter is larger than said second diameter such that a larger portion of said roller sphere extends above said upper opening than below said lower opening.

5. The metallic roll-on container of claim 1, further comprising a shoulder extending from an outer surface of said metallic container body, wherein said shoulder is configured to selectively receive a cap with an interference fit, and said cap is adapted to press said roller sphere into said second depressed position when said cap is received on said shoulder.

6. The metallic roll-on container of claim 1, wherein a thickness dimension of said at least one arcuate-shaped sidewall is constant.

7. A method for manufacturing a metallic roll-on container for applying a product onto an external surface, comprising:
forming a container body from a slug of metallic material, said slug comprising an aluminum material, wherein said container body extends from a closed bottom end to an open top end, and said container body has at least one arcuate-shaped sidewall that defines an upper opening at said open top end with a first diameter, and a lower opening with a second diameter;
providing a roller sphere having an outer diameter that is larger than said first diameter of said upper opening, wherein said diameter of said roller sphere is between approximately 0.8% to 1.3% larger than said first diameter of said upper opening;
pressing said roller sphere into said at least one arcuate-shaped sidewall at said upper opening to deform said at least one arcuate-shaped sidewall such that said first diameter increases to match said outer diameter of said roller sphere; and
releasing an elastic portion of said deformation of said at least one arcuate-shaped sidewall after said roller sphere passes through said upper opening such that said outer diameter of said roller sphere remains larger than said first diameter of said upper opening, and said roller sphere is retained within said container body.

8. The method of claim 7, wherein said forming said container body comprises impact extruding said slug of said metallic material.

9. The method of claim 8, further comprising trimming at least a portion of said container body after said impact extruding.

10. The method of claim 7, further comprising:
melting and casting said metallic material into a slab;
rolling said slab to a predetermined thickness;
cooling said slab at an ambient temperature between approximately 59° F. to 122° F.;
punching said slug from said cooled slab; and
annealing said slug, wherein a peak temperature of said slug is between approximately 842° F. to 1058° F.

11. The method of claim 7, further comprising:
providing a scrap metallic material;
melting said scrap metallic material with a 1070 aluminum alloy to form said slug of metallic material having:
between 97.70 wt. % aluminum and 98.50 wt. % aluminum,
between 0.16 wt. % Si and 0.24 wt. % Si,
between 0.37 wt. % Fe and 0.48 wt. % Fe,
between 0.08 wt. % Cu and 0.15 wt. % Cu,
between 0.48 wt. % Mn and 0.71 wt. % Mn,
between 0.34 wt. % Mg and 0.52 wt. % Mg,
between 0.06 wt. % Zn and 0.12 wt. % Zn,
between 0.01 wt. % Cr and 0.04 wt. % Cr, and
between 0.00 wt. % Ti and 0.04 wt. % Ti.

12. The method of claim 7, further comprising:
forming a shoulder on an outer surface of said container body;
forming an inward curl on a cap that defines a cap opening; and
pressing said cap onto said shoulder such that said curl forms an interference fit with said shoulder, and said cap presses said roller sphere into said lower opening.

13. The method of claim 7, further comprising:
moving said roller sphere to a first extended position, wherein said roller sphere is seated against said upper opening of said at least one arcuate-shaped sidewall, and a chamber between said roller sphere and said at least one arcuate-shaped sidewall is in fluid communication with said container body and can receive a product stored in said container body; and
moving said roller sphere to a second depressed position, wherein said roller sphere is seated against said lower opening of said at least one arcuate-shaped sidewall, and said chamber is no longer in fluid communication with said product stored in said container body, and wherein said roller sphere rotates to allow the application of said product in said chamber to an external surface.

14. A metallic roll-on container system for applying a liquid product onto a user's skin, comprising:
a metallic container body extending along a longitudinal axis from a closed bottom end to an open top end;
at least one arcuate-shaped sidewall of said metallic container body that defines an upper opening with a first diameter, a lower opening with a second diameter, and a maximum inner diameter located between said upper and lower openings, wherein a thickness dimension of said at least one arcuate-shaped sidewall is constant;
a roller sphere positioned in said open top end of said metallic container body and seated at least partially between said upper opening and said lower opening to define a chamber between said roller sphere and said at least one arcuate-shaped sidewall, wherein a diameter of said roller sphere is greater than said first diameter and greater than said second diameter, and said diameter of said roller sphere is less than said maximum inner diameter;
an outwardly-extending shoulder of said metallic container body positioned below said lower opening along said longitudinal axis, said shoulder having a diameter that is larger than said maximum inner diameter; and
a cap selectively connected to said shoulder with an interference fit, wherein, when said cap is selectively connected to said shoulder, said cap presses said roller sphere against said lower opening, wherein said metallic container body and said cap are each made of a material having a Young's Modulus greater than 50 GPa.

15. The system of claim 14, wherein said cap has an inwardly-extending curl that defines an opening with an inner diameter that is less than said diameter of said shoulder to form said interference fit.

16. The system of claim 15, further comprising:
a first recess extending into an outer surface of said metallic container body, wherein said metallic container body defines said lower opening at said first recess; and
a second recess extending into an outer surface of said metallic container body, wherein said curl of said cap extends into said second recess wherein said cap is selectively connected to said metallic container body.

17. The system of claim 14, wherein said metallic container body comprises an aluminum material, and said diameter of said roller sphere is between approximately 0.8% to 1.3% larger than said first diameter of said upper opening.

18. The system of claim 14, wherein a first distance between said maximum inner diameter to said upper opening along said longitudinal axis is less than a second distance between said maximum inner diameter to said lower opening along said longitudinal axis such that a larger portion of said roller sphere extends above said upper opening than below said lower opening.

19. The system of claim 14, wherein said at least one arcuate sidewall comprises a first arcuate sidewall that defines said upper opening and a second arcuate sidewall that defines said lower opening.

20. The system of claim 14, wherein said thickness dimension is between 0.35 mm and 0.55 mm.

* * * * *